(12) United States Patent
Engerman

(10) Patent No.: US 11,623,513 B2
(45) Date of Patent: Apr. 11, 2023

(54) ELECTRIC DRIVE AXLE IN A VEHICLE

(71) Applicant: Dana Automotive Systems Group, LLC, Maumee, OH (US)

(72) Inventor: Eric M. Engerman, Plymouth, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/822,094

(22) Filed: Aug. 24, 2022

(65) Prior Publication Data

US 2022/0410703 A1 Dec. 29, 2022

Related U.S. Application Data

(63) Continuation of application No. 17/081,861, filed on Oct. 27, 2020.

(60) Provisional application No. 62/934,462, filed on Nov. 12, 2019.

(51) Int. Cl.
*B60K 17/16* (2006.01)
*B60K 1/00* (2006.01)
*F16H 48/36* (2012.01)

(52) U.S. Cl.
CPC ........ *B60K 17/16* (2013.01); *B60K 2001/001* (2013.01); *F16H 2048/364* (2013.01)

(58) Field of Classification Search
CPC .... B60K 1/00; B60K 17/16; B60K 2001/001; F16H 2048/364; B60Y 2410/10
See application file for complete search history.

(56) References Cited

U.S. PATENT DOCUMENTS

| | | | |
|---|---|---|---|
| 10,525,810 | B2 | 1/2020 | Jegebris et al. |
| 11,125,312 | B2 | 9/2021 | Marsh et al. |
| 2018/0236861 | A1 | 8/2018 | Jegebris et al. |
| 2018/0259049 | A1 | 9/2018 | Marsh et al. |
| 2018/0345786 | A1 | 12/2018 | Kucharski |
| 2020/0086731 | A1* | 3/2020 | Yohannes ............ B60K 5/1208 |

* cited by examiner

*Primary Examiner* — Tinh Dang
(74) *Attorney, Agent, or Firm* — McCoy Russell LLP

(57) ABSTRACT

An electric drive axle in a vehicle is provided. The electric drive axle includes, in one example, a housing configured to enclose an electric motor-generator and a gearbox. In the electric drive axle, the housing includes a first section that is removably coupled to a second section, the second section at least partially encloses the gearbox, the first section includes a first axle shaft opening, and the second section includes a second axle shaft opening that is laterally aligned with the first axle shaft opening.

20 Claims, 4 Drawing Sheets

ELECTRIC DRIVE AXLE IN A VEHICLE

CROSS-REFERENCE TO RELATED APPLICATIONS

The present application is a continuation of U.S. Non-Provisional patent application Ser. No. 17/081,861, entitled "ELECTRIC DRIVE AXLE IN A VEHICLE", and filed on Oct. 27, 2020. U.S. Non-Provisional application patent Ser. No. 17/081,861 priority to U.S. Provisional Patent Application No. 62/934,462, entitled "ELECTRIC DRIVE AXLE IN A VEHICLE", and filed Nov. 12, 2019. The entire contents of the above-listed application are hereby incorporated by reference for all purposes.

TECHNICAL FIELD

The present disclosure relates to an electric drive axle in a vehicle.

BACKGROUND AND SUMMARY

Electric and hybrid-electric vehicles utilize an electric power source coupled to an electric motor-generator to deliver motive power to a vehicle drivetrain. Certain types of electric and hybrid vehicles have endeavored to deploy electric drive axles. The electric drive axle can be adapted for different types of vehicles. However, the inventors have recognized that previous electric dive axles have presented issues with regard to axle assembly layout and axle housing packaging. For instance, difficulties may arise when attempting to compactly package the axle assembly in the vehicle while maintaining a targeted amount of structural integrity. These issues are further exacerbated in rigid beam axles that at least partially carry vehicle loads. Further still, there can be issues with decreased axle clearance that make the axle more susceptible to degradation from objects such as road debris, rocks and other natural object when driving off-road, etc. Electric vehicles may pose packaging challenges with regard to other vehicle components, such as vehicle battery packs. Other types of electric vehicles utilizing independent suspension systems may present challenges with regard to load carrying capacity, durability, axle assembly, and servicing.

To address at least some of the aforementioned drawbacks, an electric drive axle is provided. The electric drive axle includes, in one example, a housing configured to enclose an electric motor-generator and a gearbox. In the electric drive axle, the housing includes a first section that is removably coupled to a second section. Further in the drive axle, the second section at least partially encloses the gearbox. Additionally, in the axle, the first section includes a first axle shaft opening and the second section includes a second axle shaft opening that is laterally aligned with the first axle shaft opening. In this way, a space efficient housing is provided in the drive axle to house and protect the electric motor-generator and the gearbox, while cooperating with the load-bearing action of the axle. Consequently, the electric drive axle may be compactly integrated into a vehicle, if desired, resulting in simplified and lower cost axle manufacturing as well as servicing.

In another example, the electric drive axle may be a rigid beam axle. Providing an electrified rigid beam axle in the vehicle allows the axle to carry heavier loads and achieve increased durability when compared to independent suspension designs, for instance.

In yet another example, the second section in the electric drive axle's housing may longitudinally extend between a rotational axis of the electric motor-generator and a rotational axis of an axle shaft. In this way, the gearbox enclosure may compactly enclose the gearbox between the axle shaft and the motor's output. This compact axle assembly package may reduce the likelihood of axle degradation from road debris, obstacles, etc. as well as facilitate gains in suspension performance, wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

FIGS. 1-4 are drawn approximately to scale. However, other relative dimensions may be used, in other embodiments.

An electric drive axle assembly including a housing space efficiently packaging the internal components is described herein. The housing includes access panels coupled to a housing body profiled to enclose an electric motor, a gearbox, and a differential, in some instances. The access panels may specifically include a first panel on a lateral side of the housing body that provides access to the gearbox and a second panel on a longitudinal side of the housing body that provides access to a differential. Arranging the housing panels and body in this manner allows the gearbox and differential to be efficiently installed, accessed, and repaired, if so desired. The streamlined axle component access may increase customer appeal and satisfaction. The panel that provides access to the gearbox may include a first axle shaft opening and the housing body may include a second axle shaft opening. Arranging the axle shaft opening in this manner, may allow the gearbox to be enclosed at a later stage in axle manufacturing, when compared to axle assemblies with a clamshell style housing. In this way, the manufacturing adaptability may be increased and the manufacturing costs may be decreased, in certain cases, if wanted. The housing body may further include reinforcing ribs that extend across a depression formed between a motor enclosure and a differential enclosure. In this way, the housing may achieve a desired amount of structural integrity without unduly increasing the axle assembly's mass. As a result, the vehicle's unsprung mass may be maintained below a desired value, allowing suspension and handling performance to be increased. The housing may further include a third access panel that at least partially encloses an electric motor. Continuing with such an example, the third access panel is located on a side of the housing laterally opposing the first access panel. This arrangement allows the electric motor and the gearbox to be independently accessed, further streamlining axle assembly, repair, and/or servicing, if desired.

Figure 1:
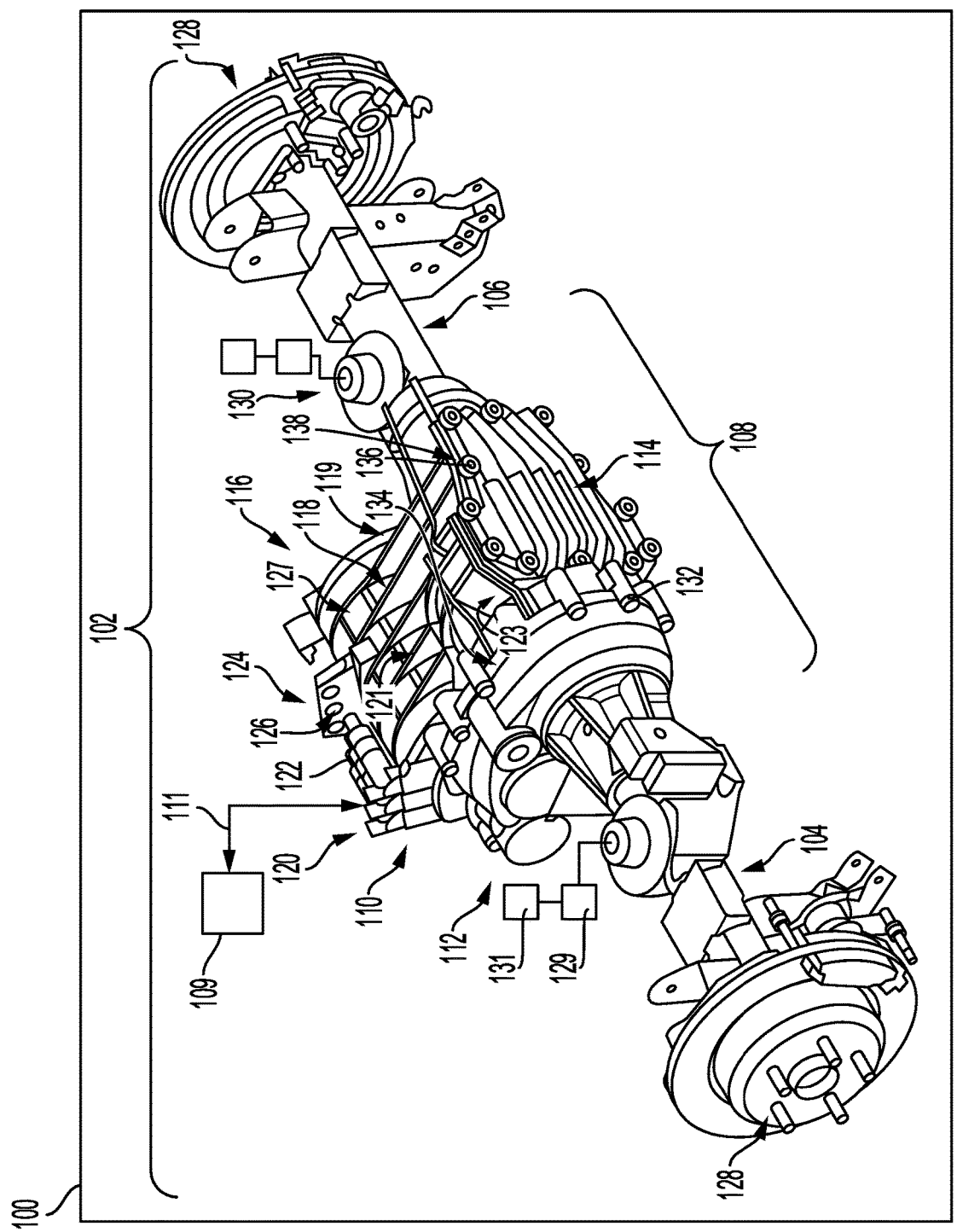
FIG. 1 shows a perspective view of an electric drive axle in a vehicle, according to an exemplary embodiment.

FIG. 1 illustrates a vehicle 100 with an electric drive axle 102. The vehicle 100 may be a battery electric vehicle where one or more electric drive axles are used for motive power generation. Hybrid type vehicles have also been envisioned where an internal combustion engine is used along with an electric drive axle for motive power generation. For instance, an internal combustion engine may drive a second axle in the vehicle. However, numerous hybrid vehicle designs have been contemplated. It will be appreciated that the vehicle 100 may take a variety of forms such as a passenger vehicle, an off-road vehicle, a commercial vehicle, a light duty vehicle, heavy duty vehicle, an agricultural vehicle, etc. Although the vehicle is schematically illustrated in FIG. 1 it will be understood that the vehicle may have structural features that are not captured via the simplified illustration.

An axis system 150 is provided in FIG. 1 for reference. The axis system 150 includes a z-axis, a y-axis, and an x-axis. The z-axis may be parallel to a gravitational axis, the x-axis may be a lateral axis, and/or the y-axis may be a longitudinal axis. However, the axes may have other orientations, in other examples.

The electric drive axle 102 may be a rigid beam axle that is weight bearing. The rigid beam axle includes an axle having a set of wheels laterally connected by a common shaft. Providing an electrified rigid beam axle may allow the durability of the vehicle's drivetrain to be increased and may have benefits with regard to traction and braking when compared to other suspension designs such as independent axle suspension designs. To elaborate, beam axles may have increased durability, increased load carrying capacity, and allow for greater articulation when compared to vehicles using independent suspension designs, for example.

The electric drive axle 102 may be a front or rear axle and may be a steerable axle, in some embodiments, or a non-steerable axle, in other embodiments. In any of these embodiments, the electric motor-generator in the drive axle may be positioned longitudinally offset from shaft sections (e.g., half shafts) 104, 106 with regard to the x-axis. Positioning the electric motor-generator longitudinally offset from the shaft sections enables the motor to be space efficiently integrated into the drive axle. In other embodiments, however, the electric motor-generator may be axially aligned with the shaft sections.

The electric drive axle 102 includes a housing 108. In one example, the housing 108 may at least partially enclose a motor-generator, a gearbox, and/or a differential. In this way, a compact housing can be jointly provided for the motor-generator, the gearbox, and/or the differential, in certain embodiments, resulting in more efficient electric drive axle packaging. Providing a housing enclosing the motor-generator, the gearbox, and/or the differential may enable the housing to achieve increased structural integrity when compared to housing designs where each of the motor, gearbox, and differential are separately housed in distinct enclosures. It will be appreciated that in some examples, the gearbox may include a plurality of gears and, in certain arrangements, one or more clutches.

Rotation energy may be transferred between the motor-generator and the gearbox. Likewise, rotational energy may be transferred between the gearbox and the differential. The differential may be configured to transfer rotational energy to or receive rotational energy from the first shaft section 104 (e.g., first half shaft) and the second shaft section 106 (e.g., second half shaft) and may include suitable components such as pinions, side gears, etc., to achieve the rotational energy transfer functionality. However, in other embodiments, the differential may not be included in the electric drive axle 102. It will be appreciated that the gearbox may provide gear reduction, to enable the wheels to be driven at a target speed while allowing the electric motor to operate in a desired range. It will also be appreciated that the description of axle half shafts may not denote an exact quantity of shaft division, but may more generally infer that the shaft is split into different sections, in some examples.

Additionally, the electric motor-generator is configured to generate rotational output in a drive mode and/or generate electrical energy responsive to receiving a rotational input in a regeneration mode. Components, such as rotors and stators, may be included in the motor-generator to allow the motor-generator to be operated in the drive and/or regeneration modes. It will be appreciated that an energy storage device (e.g., battery, capacitor, and the like) may be coupled to the electric motor-generator via an inverter 109, schematically depicted in FIG. 1, where the inverter is mounted separately from the axle and housing combination. Thus, the inverter 109 may be spaced away from electric drive axle 102, in one example. The inverter 109 is configured to convert direct current into alternating current. In such an example, the inverter 109 is electrically coupled the motor-generator in the electric drive axle 102 denoted via arrows 111. The inverter 109 may also be electrically coupled to an energy storage device. In an alternate example, the electric motor may be designed without regenerative mode functionality.

The housing 108 is partitioned into a plurality of removably attached sections to allow the electric drive axle to be efficiently assembled as well as serviced, if desired. To elaborate, the housing 108 includes a first section 110 (e.g., housing body). The housing further includes a second section 112, a third section 114, and a fourth section 116 each removably attached to the first section 110, in the depicted embodiment. However, an axle housing with a greater or fewer number of sections may be used, in other embodiments. Thus, the second, third, and fourth sections may serve as access panel. To elaborate, the first section 110 is coupled to the second section 112 via attachment devices 132 at an interface 134. Specifically, in the illustrated example, the removable attachment is achieved via bolts mating with bosses. However, numerous suitable types of attachment devices may be used, in other examples. The interface 134 may be configured to fluidly seal interior cavities in the housing 108, in one example. The first section 110 is coupled to the third section 114 via attachment devices 136 at an interface 138.

In one use-case example, the third section 114 may be removed from the first section 110 to allow gearing in the gearbox to be accessed, repaired, and/or replaced. This may be particularly desirable in vehicles where gear ratio selection may occur at a later stage in manufacturing.

Further, in certain embodiments, the second section 112, the third section 114, and/or the fourth section 116 may be access panels allowing for efficient assembly, servicing, and/or reconfiguration of components such as gears in the gearbox, electric motor-generator components, and/or gears in the differential. In this embodiment, the first section 110 serves as a housing body profiled to partially enclose and receive components of the axle assembly such as the electric motor-generator.

The second section 112 (e.g., access panel) of the housing 108 may be arranged at a non-parallel angle with regard to the third section 114 (e.g., access panel) of the housing. Specifically, in one example, the angle formed between the second and third housing sections may be approximately perpendicular. Arranging the housing sections in this manner allows a greater number of the components in the housing to be accessed, serviced, etc. The perpendicular arrangement of the second and third sections 112, 114 allows personnel to more easily and independently access the gearbox and the differential. However, other angular orientations between the second and third housing sections may be used, in other examples. The third section 114 may further have an asymmetric profile with regard to a vertical axis to facilitate more efficient access of the differential and other internal axle componentry.

In some embodiment, the housing 108 may not be coupled to a vehicle body (e.g., vehicle frame) other than through the axle (e.g., rigid beam axle). In this way, the housing may be efficiently incorporated into the axle assembly, to facilitate simplified packaging of other vehicle components, such as battery packs, suspension components, etc. However, in other examples, the housing may be coupled to the vehicle body.

The housing 108 may include an electrical interface 120. The electrical interface 120 may include a plurality of electrical connectors 122 for coupling with the inverter. A portion of the electrical connectors 122 (e.g., negative and positive terminals) may be configured to supply the motor-generator with electrical energy to or receive electrical energy from the motor-generator. Another portion of the electrical connectors 122 may be designed to transfer control signals to the motor-generator and/or gearbox as well as receive sensor signals from the motor and/or gearbox. In this way, the electrical interface 120 can provide electrical current distribution for motive power generation in the motor as well as serve as a command/sensor signal interface. The electrical connectors 122 are shown laterally aligned which may allow for the compact routing of electrical cables therefrom. However, the electrical connectors 122 may have a variety of alignments, in other embodiments.

A wiring harness 124 may also be included in the housing 108. The wiring harness 124 includes openings 126 allowing wires to be routed along a desired path on their way to an energy storage device, controller, etc. The opening 126 may be aligned with the electrical connectors 122, in some examples. However, in other examples, the openings may be angled with regard to the electrical connectors 122 to enable the electrical cable path to be redirected as desired. The wiring harness 124 allows for cable separation to reduce the chance of cable degradation. Consequently, the drive axle's longevity is increased. The wiring harness 124 and the electrical interface 120 may be positioned on a top side 127 of the housing 108, to reduce the chance of component degradation caused by impacts from external objects during vehicle operation. However, axle embodiments with the wiring harness 124 and/or electrical interface 120 positioned on a bottom side of the housing have been contemplated.

Wheel bearing assemblies 128 are also shown rotationally coupled to the first shaft section 104 and the second shaft section 106. The wheel bearing assemblies 128 are designed to allow for wheel rotation and may have wheels mounted thereto.

Shock absorbers (e.g., leaf springs, coil springs, air springs, combinations thereof, etc.) may be coupled to the first shaft section 104 and/or the second shaft section 106. In this way, a suspension system 129, schematically illustrated in FIG. 1, may be coupled to the electric drive axle 102. It will be understood that the suspension system may include additional or alternative components such as dampening components, struts, linkage, and the like. The electric drive axle 102 may include mounting interfaces 130 to accommodate for the attachment of shock absorbers and/or other suspension system components. The suspension system 129 may be further coupled to a vehicle frame schematically illustrated at 131. Thus, the electric drive axle 102 may form an unsprung portion of the vehicle and the frame 131 and other conventional components may form a sprung portion of the vehicle. The housing 108 of the electric drive axle 102 may include various structural features, expanded upon herein, that allow the axle's weight to be reduced, if desired. In this way, the vehicle's unsprung mass may be reduced to increase vehicle handling and suspension performance.

Figure 2:
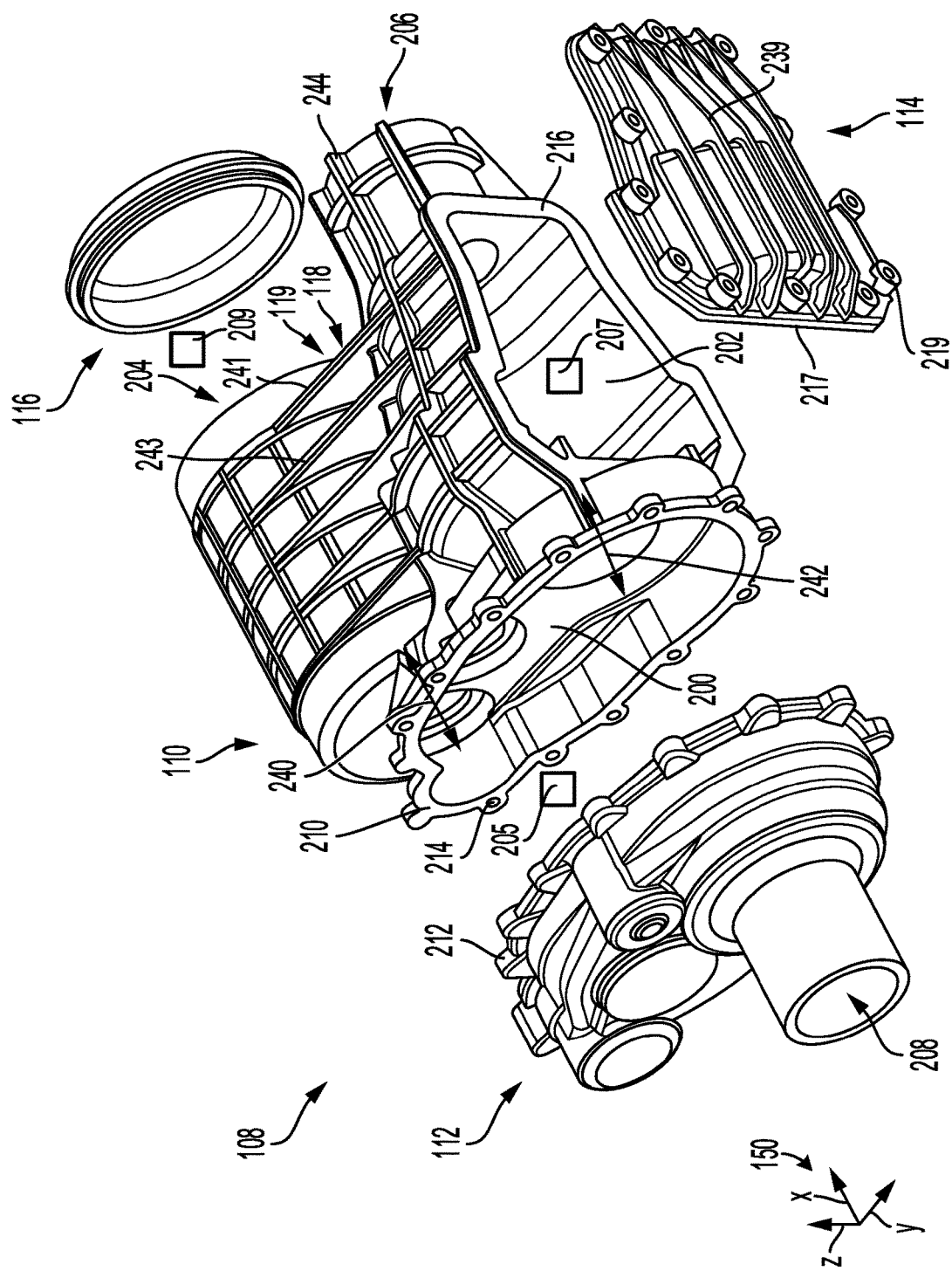
FIG. 2 shows a first exploded view of a housing included in the electric drive axle, depicted in FIG. 1.
Figure 3:
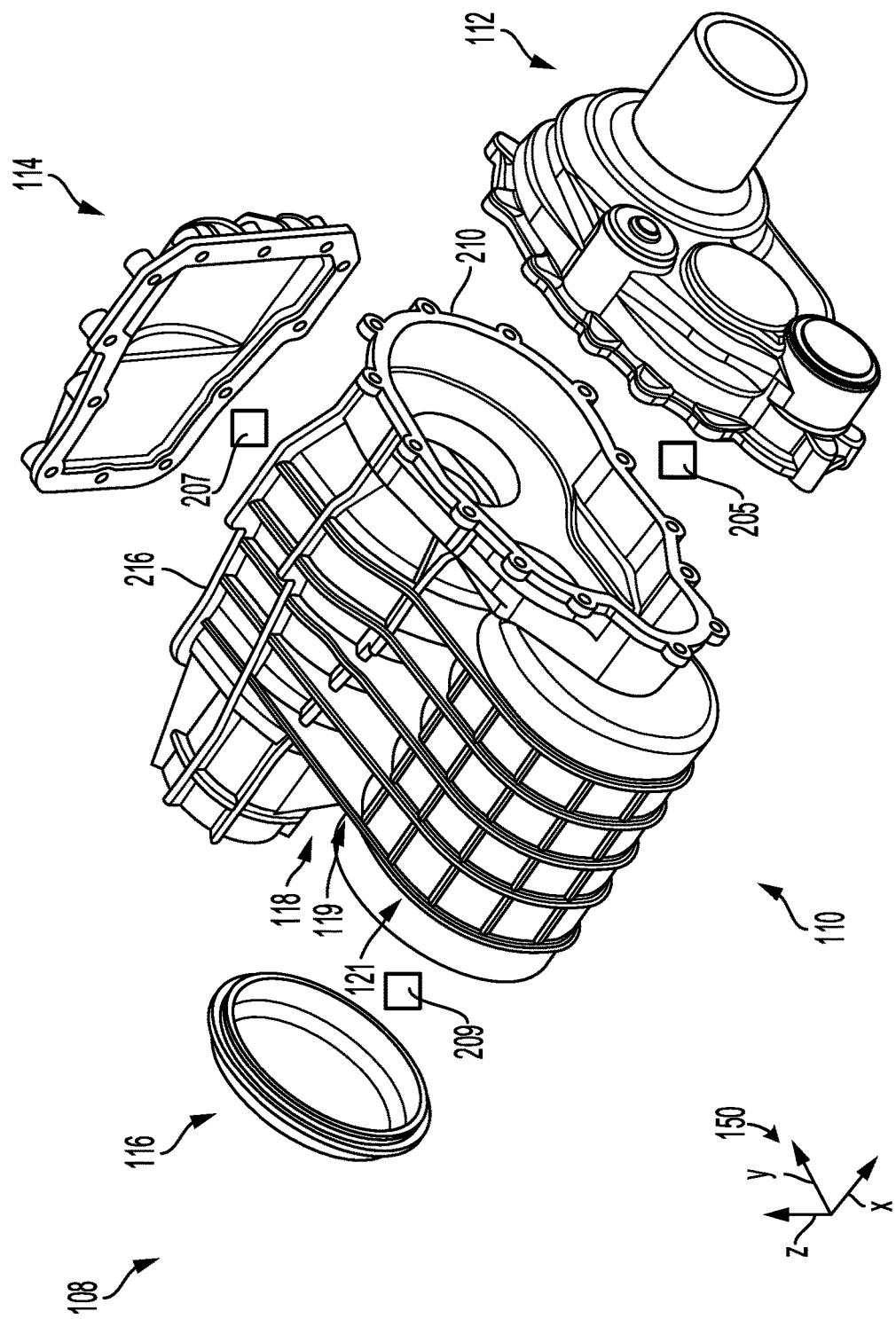
FIG. 3 shows a second exploded view of the housing included in the electric drive axle, depicted in FIG. 1.

FIGS. 2-3 show detailed exploded views of the housing 108. Turning specifically to FIG. 2 illustrating the housing 108 with the first section 110, second section 112, third section 114, and fourth section 116. The first section 110 may include a first cavity 200, a second cavity 202, and/or a third cavity 204. When the axle is assembled, the first cavity 200 may at least partially house a portion of a gearbox 205, the second cavity 202 may at least partially house a differential 207, and/or the third cavity 204 may at least partially house an electric motor-generator 209, in some examples. The first cavity 200 may extend in a longitudinal direction and accommodate for efficient packaging of gears in the gearbox. However, other contours of the first cavity may be used, in other examples. The third cavity 204 may be cylindrical in shape to accommodate for efficient enclosure of the electric motor-generator. Although, the gearbox 205, the differential 207, and the electric motor-generator 209 are schematically illustrated, it will be appreciated that these devices may exhibit greater structural complexity and include common components, such as a rotor, a stator, gears, axle shafts, and the like.

The first housing section 110 includes an opening 206 sized to receive the second shaft section 106, shown in FIG. 1, and the second housing section 112 includes an opening 208 sized to receive the first shaft section 104, shown in FIG. 1. Thus, the openings may be cylindrical in shape. The openings 206, 208 may therefore be laterally aligned and positioned on laterally opposing sides of the housing assembly. Arranging the opening 208 in one of the access panels may allow the gearbox 205 to be installed at a later stage in axle manufacturing, if wanted. Consequently, the axle's adaptability is expanded.

The first section 110 includes a first flange 210. The second section 112 includes a flange 212 in face sharing contact with the first flange 210. The first flange 210 may include holes 214 configured to receive attachment devices, allowing the first housing section 110 to be attached to the second housing section 112.

The first section 110 of the housing 108 may include a second flange 216. The second flange 216 may be arranged at an angle 400 (e.g., perpendicular angle), shown in FIG. 4, with regard to the first flange 210. In this way, a greater breadth of the gearbox may be accessed during axle servicing, for instance. However, in other examples, the first flange 210 may be parallel to the second flange 216. The second flange 216 may be in face sharing contact with a flange 217 in the third section 114 when the axle is assembled. The flange 217 is shown including bosses 219 to allow the third housing section to be coupled to the first housing section. However, other suitable removable attachment techniques between the first and third housing sections may be utilized.

The fourth housing section 116 and the first section 110 may be interference fit, when assembled. Additionally or alternatively, attachment devices may be used to attach the fourth housing section 116 to the first housing section 110.

FIG. 2 further depicts the reinforcing ribs 118 that may be included in the axle housing body. The reinforcing ribs 118 enable the housing structural integrity to be increased without increasing the axle's weight beyond a design target. Consequently, vehicle handing and suspension performance may be increased due to a reduction in the vehicle's unsprung weight when compared to housing structures which simply increase wall thickness to achieve structural integrity. As illustrated, a portion of the ribs 118 extend (e.g., longitudinally extend) across a depression 119 formed between a motor enclosure 121 and a differential enclosure 123. In this way, the housing may maintain a relatively compact profile while the housing is strengthened. To elaborate, the load-bearing action of the axle may be improved without unduly increasing the axle housing's size. It will be understood that the reinforcing ribs 118 may be arranged substantially parallel to the y-axis. As such, the reinforcing ribs 118 may include opposing planar sides 241 each of which are parallel to a z-y plane. Although, other rib contours have been envisioned.

The reinforcing ribs 118 may further serve to allow thermal energy to be transferred away from the axle to the surrounding environment. The ribs may therefore function as heat transfer fins. The vertical heights of the ribs may vary laterally and/or longitudinally to tune the structural reinforcement based on expected localized loading in different sections of the housing body to facilitate further weight reductions while achieving design targets. Thus, as illustrated, the vertical height of the ribs 243 extending across the depression 119 may be greater than the height of the ribs 244 laterally extending across the housing body. In this way, a desired balance may be struck between axle strength and compactness.

Another portion of the reinforcing ribs 118 may laterally extend across the housing body to further strengthen the housing. These laterally aligned ribs may, in some instances, extend to the axle shaft opening 206 to reinforce and support bearings and/or other components which reside therein.

Reinforcing ribs 239 may further be provided in the third section 114. The reinforcing ribs 239 may specifically laterally extend across the third section 114 to strengthen the housing with regard to torsional and bending loads without increasing the housing weight above a target value.

Components in the housing 108 may be arranged along different axes to facilitate efficient component packaging, in some embodiments. To elaborate, a first axis 240 may be a rotational axis of the electric motor-generator and/or an input shaft of the gearbox and a second axis 242 may be a rotational axis of one or more of an output shaft of the gearbox and/or the differential. The first axis 240 is shown longitudinally offset from the second axis 242. In this way, the axle assembly may be efficiently packaged. However, numerous suitable housing profiles have been envisioned.

Further, the second section 112 may longitudinally extend along the housing body from the first axis 240 to the second axis 242. In this way, personnel may gain access to a greater portion of the gearbox during axle manufacturing or repair, for instance. Increased manufacturing and repair efficiency may stem from the improved gearbox access.

FIG. 3 again shows the housing 108 with the first section 110, the second section 112, the third section 114, and the fourth section 116. The first flange 210 and the second flange 216 of the first section 110 of the housing 108 are further depicted in FIG. 3. The fourth section 116 is shown with a circular outer contour that enables the electric motor-generator 209 to be efficiently installed, accessed, and/or repaired. However, other less space efficient access panel contours may be used, in other embodiments. The fourth section 116 and the second section 112 are arranged on opposing lateral sides of the first section 110 (e.g., housing body) which enables personnel to efficiently access the electric motor-generator 209 and the gearbox 205 without impeding access to other housing sections during installation, repair, and/or repair procedures. Furthermore, the third and the fourth sections 114, 116 may be arranged longitudinally spaced away from one another to enable the access panels to be independently installed and removed during repair.

FIG. 3 again illustrates the ribs 118 with a portion of extending across the depression 119. These rib may taper in a downward direction to accommodate for the cylindrical shape of the motor.

Figure 4:
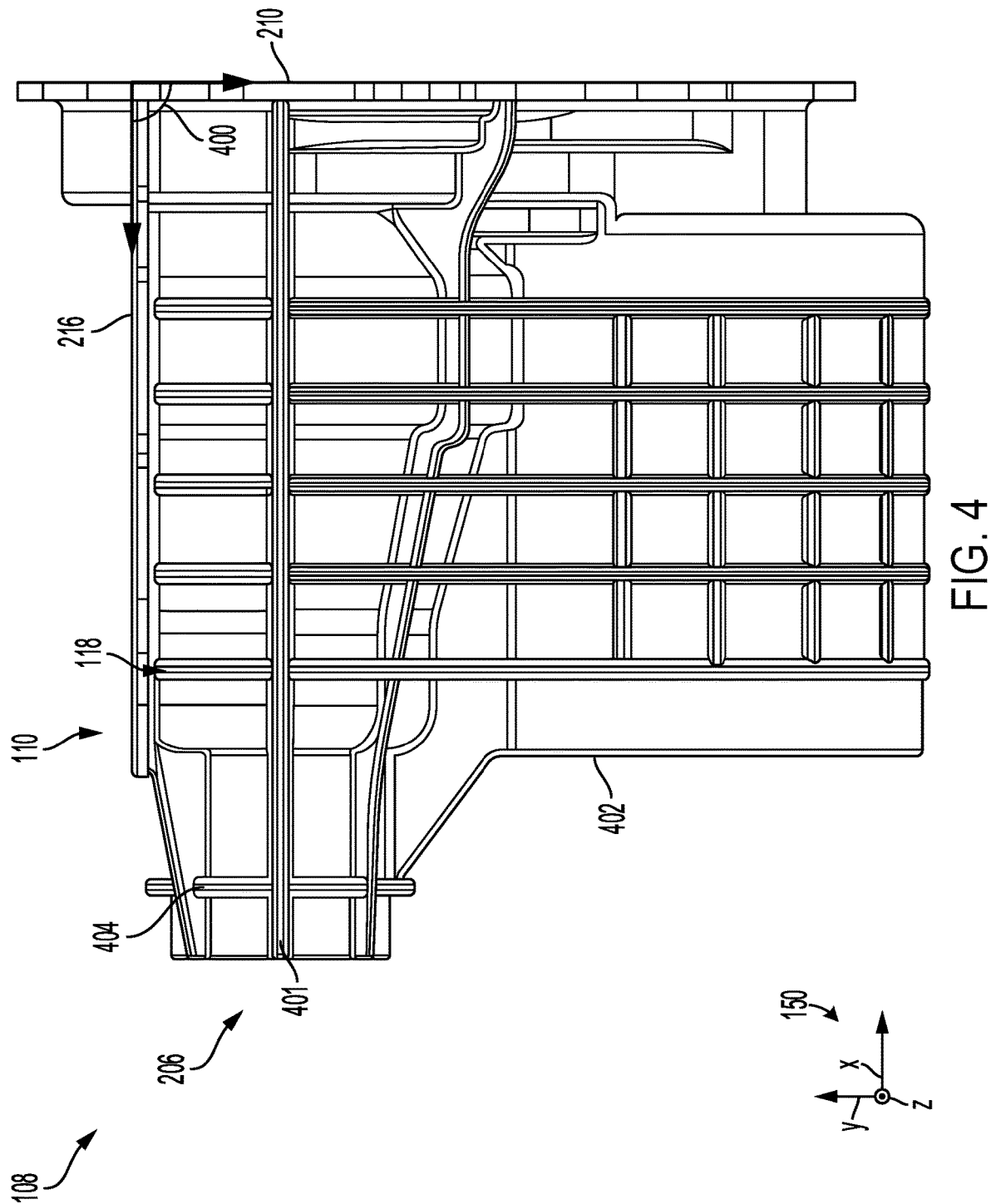
FIG. 4 shows a top view of a section of the housing, shown in FIGS. 2 and 3.

FIG. 4 shows a top view of the first section 110 of the housing 108. The opening 206 sized to receive the second shaft section 106, shown in FIG. 1, are again illustrated along with the reinforcing ribs 118. The reinforcing ribs 118 may include laterally aligned ribs 401 that intersect longitudinally aligned ribs 404 to provide more robust structural reinforcement of the housing. However, other rib arrangements may be used where the ribs do not intersect one another or intersect each other at different angles.

The first flange 210 may further be parallel to a housing surface 402 that is profiled to accept the fourth housing section 116, shown in FIG. 3. The housing surface 402 may be laterally offset from the axle shaft opening 206 in an inboard direction to further increase the axle's packaging efficiency.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. In other examples, elements offset from one another may be referred to as such. In further examples, components offset from one another may be referred to as such.

The technical effect of the axle assembly and housing described herein is to create a compactly packaged electric drive axle with increased structural integrity.

The invention will be further described in the following paragraphs. In one aspect, an electric drive axle is provided that comprises a housing configured to enclose at least one of an electric motor-generator and a gearbox; wherein the housing includes a first section that is removably coupled to a second section; wherein the second section at least partially encloses the gearbox; and wherein the first section includes a first axle shaft opening and the second section includes a second axle shaft opening that is laterally aligned with the first axle shaft opening.

In another aspect, a rigid beam electric drive axle is provided that comprises a housing configured to enclose at least a portion of each of an electric motor-generator, a gearbox, and a differential; and a pair of shaft sections that extend through a pair of axle shaft openings in the housing; wherein the housing is not directly mounted to a vehicle frame; and wherein the housing includes a first access panel that is removably coupled to a housing body and at least partially encloses one or more of the differential, the gearbox, and/or the electric motor-generator.

In any of the aspects or combinations of the aspects, the electric drive axle may be a rigid beam axle.

In any of the aspects or combinations of the aspects, the second section may longitudinally extend between a rotational axis of the electric motor-generator and a rotational axis of an axle shaft.

In any of the aspects or combinations of the aspects, the housing may include a plurality of reinforcing ribs that traverse a depression formed between a motor enclosure and a differential enclosure.

In any of the aspects or combinations of the aspects, the housing may include a third section removably coupled to the first section and configured to enclose a differential.

In any of the aspects or combinations of the aspects, the housing may include a fourth section removably coupled to the first section and configured to at least partially enclose the electric motor-generator.

In any of the aspects or combinations of the aspects, a first interface may be formed between the first section and the second section and at least partially circumferentially surrounds the gearbox.

In any of the aspects or combinations of the aspects, a second interface may be formed between the third section and the first interface and may be laterally offset from the second interface.

In any of the aspects or combinations of the aspects, the first interface and the second interface may be perpendicularly arranged in relation to one another.

In any of the aspects or combinations of the aspects, the fourth section may be laterally offset from the first axle shaft opening.

In any of the aspects or combinations of the aspects, the housing body may include a first axle shaft opening and the first access panel include a second axle shaft opening and wherein the first access panel longitudinally extends between a rotational axis of the electric motor-generator and a rotational axis of an axle shaft.

In any of the aspects or combinations of the aspects, the housing may comprises: one or more longitudinal reinforcing ribs traversing a depression formed between a motor enclosure and a differential enclosure; and one or more lateral reinforcing ribs intersecting the one or more longitudinal reinforcing ribs.

In any of the aspects or combinations of the aspects, the housing may include a second access panel and wherein the second access panel provides access to the differential and is arranged at a non-parallel angle in relation to the first access panel.

In any of the aspects or combinations of the aspects, the housing may comprise a third access panel that at least partially encloses the electric motor-generator.

In any of the aspects or combinations of the aspects, the first access panel may be arranged perpendicular to the second access panel.

In any of the aspects or combinations of the aspects, the third access panel and the first access panel may be positioned on laterally opposing sides of the housing.

In any of the aspects or combinations of the aspects, the third access panel may be laterally offset from one of the openings in the pair axle shaft openings.

In any of the aspects or combinations of the aspects, an interface may be formed between the first access panel and the housing body and wherein the interface is configured to at least partially circumferentially enclose the gearbox.

In any of the aspects or combinations of the aspects, the pair of axle shaft openings in the housing may be laterally aligned.

In another representation, a solid beam electrified axle is provided that comprises a housing body with a plurality of access panels that provide access to a gearbox, an electric motor, and a differential and wherein the housing body includes a first axle shaft opening, one of the plurality of access panels includes a second axle shaft opening, one of the access panels longitudinally extends from an axis of rotation of the electric motor and an axis of rotation of an axle shaft, and wherein one of the access panels is positioned longitudinally outboard from the axis of rotation of the axle shaft.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. It will therefore be appreciated that the configurations disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the term "substantially" and "approximately" are construed to mean plus or minus five percent or less of a range or value, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A rigid beam electric drive axle comprising:
a housing with two axle shaft openings that include two axle shafts which extend therethrough, respectively, wherein the housing includes:
a housing body that at least partially encloses an electric motor, a gearbox, and a differential;
a first access panel removably attached to a first flange of the housing body via a plurality of attachment devices and providing access to the differential; and
a second access panel removably attached to a second flange of the housing body via a plurality of attachment devices and providing access to at least one of the gearbox and the electric motor; and
an inverter electrically coupled to the electric motor;
wherein the first flange is arranged perpendicular to the second flange; and
wherein the housing body includes a plurality of reinforcing ribs that laterally extend across an outer surface of the housing body.

2. The rigid beam electric drive axle of claim 1, wherein the plurality of reinforcing ribs each have varying heights.

3. The rigid beam electric drive axle of claim 1, wherein the plurality of reinforcing ribs traverse a depression formed between a motor enclosure and a differential enclosure.

4. The rigid beam electric drive axle of claim 1, wherein the electric motor is an electric motor-generator.

5. The rigid beam electric drive axle of claim 1, wherein the housing is not directly mounted to a vehicle frame.

6. The rigid beam electric drive axle of claim 1, wherein the housing body includes at least one of the two axle shaft openings.

7. The rigid beam electric drive axle of claim 1, further comprising a plurality of mounting interfaces that are each configured to attach to one or more suspension system components.

8. The rigid beam electric drive axle of claim 7, wherein the one or more suspension system components are shock absorbers.

9. The rigid beam electric drive axle of claim 1, wherein the rigid beam electric drive axle is a non-steerable axle.

10. The rigid beam electric drive axle of claim 1, wherein the rigid beam electric drive axle forms an unsprung portion of a vehicle.

11. The rigid beam electric drive axle of claim 1, further comprising two wheel bearing assemblies coupled to the two axle shafts, respectively.

12. The rigid beam electric drive axle of claim 1, wherein the housing further comprises an electrical interface that includes a plurality of electrical connectors which are coupled to the inverter.

13. The rigid beam electric drive axle of claim 1, wherein a rotational axis of the electric motor is parallel to rotational axes of the two axle shafts.

14. The rigid beam electric drive axle of claim 1, wherein the first and/or second flanges include a plurality of bosses.

15. A non-steerable solid beam electrified axle comprising:
a housing with two axle shaft openings that include two axle shafts that extend therethrough, wherein the housing includes:
a housing body that at least partially encloses an electric motor, a gearbox, and a differential;
a first access panel removably attached to a first flange of the housing body via a plurality of attachment devices and providing access to the differential; and
a second access panel removably attached to a second flange of the housing body via a plurality of attachment devices and providing access to at least one of the gearbox and the electric motor;
an inverter electrically coupled to the electric motor;
an electrical interface that includes a plurality of electrical connectors coupled to the inverter; and
two wheel bearing assemblies coupled to the two axle shafts, respectively;
wherein the first flange is arranged perpendicular to the second flange; and
wherein the housing body includes a plurality of reinforcing ribs that laterally extend across an outer surface.

16. The non-steerable solid beam electrified axle of claim 15, wherein the plurality of reinforcing ribs traverse a depression formed between a motor enclosure and a differential enclosure and are parallel to one another.

17. The non-steerable solid beam electrified axle of claim 15, wherein the first and second flanges include a plurality of bosses that are designed to receive the respective plurality of attachment devices.

18. The non-steerable solid beam electrified axle of claim 15, wherein a rotational axis of the electric motor is parallel to rotational axes of the two axle shafts.

19. The non-steerable solid beam electrified axle of claim 15, wherein the first access panel has an asymmetric profile.

20. The non-steerable solid beam electrified axle of claim 15, further comprising a plurality of mounting interfaces that are each configured to attach to one or more shock absorbers that include one or more of a leaf spring, a coil spring, and an air spring.

* * * * *